United States Patent [19]
Kunz

[11] 3,972,598
[45] Aug. 3, 1976

[54] MULTIFACETED MIRROR STRUCTURE FOR INFRARED RADIATION DETECTOR

[75] Inventor: Raymond J. Kunz, State College, Pa.

[73] Assignee: Leco Corporation, St. Joseph, Mich.

[22] Filed: Sept. 9, 1974

[21] Appl. No.: 504,587

[52] U.S. Cl. ............................ 350/293; 250/338; 340/258 D; 350/296; 350/299
[51] Int. Cl.² ........................................ G02B 5/10
[58] Field of Search ............... 250/338, 342, 353; 340/258 R, 258 B, 258 D; 350/292, 293–296, 299

[56] References Cited
UNITED STATES PATENTS

| | | | |
|---|---|---|---|
| 797,891 | 8/1905 | Himalaya | 126/270 |
| 811,274 | 1/1906 | Carter | 126/271 |
| 1,193,999 | 8/1916 | Dixon | 250/209 X |
| 1,248,456 | 12/1917 | Clark | 350/292 X |
| 1,919,561 | 7/1933 | Kögel | 350/303 |
| 2,987,961 | 6/1961 | Cotton et al. | 350/292 |
| 3,009,391 | 11/1961 | Zagieboylo et al. | 350/292 |
| 3,137,757 | 6/1964 | Martin et al. | 356/95 |
| 3,631,434 | 12/1971 | Schwartz | 340/258 D |
| 3,703,718 | 11/1972 | Berman | 250/338 X |

FOREIGN PATENTS OR APPLICATIONS

| | | |
|---|---|---|
| 608,864 | 9/1948 | United Kingdom |
| 1,264,809 | 2/1972 | United Kingdom |

*Primary Examiner*—John K. Corbin
*Assistant Examiner*—F. L. Evans
*Attorney, Agent, or Firm*—Price, Heneveld, Huizenga & Cooper

[57] ABSTRACT

Infrared radiation can be gathered from a number of discrete, spaced apart fields of view and focused on a single sensing element with a multifaceted mirror. Each facet of the mirror is a concave surface, preferably spherical, which is oriented to gather infrared radiation from a predetermined field of view and reflect the infrared radiation to a radiation sensing element.

10 Claims, 27 Drawing Figures

MULTIFACETED MIRROR STRUCTURE FOR INFRARED RADIATION DETECTOR

BACKGROUND OF THE INVENTION

A construction of infrared intrusion detectors, i.e., infrared radiation detectors intended to produce an alarm upon the detection of an intruding human, poses both optical and detector fabrication problems. It is frequently desired to cover a 90° field of view, for example when the detector is placed in the corner of a room. Merely placing an infrared radiation detector in the room is infeasible. There must in addition be a focusing mechanism to gather infrared radiation from the intruder, wherever he or she might be, and focus this radiation on the infrared sensing element. If the spherical mirror is used to cover a 90° field of view, the detector must be large enough to cover this 90° field of view. For a low energy system, such as an intruding person entering the field of view of the detector, the energy received by the infrared radiation detecting element must be chopped and amplified many times in order to provide a sufficiently low detection limit that a human intruder can be detected. This approach would require a large and complex system. The required detector element size would then have to be larger than practical. This is because the image plane of the spherical mirror is itself a spherical surface with the same radius of curvature as the focal length of the mirror (i.e., one-half the radius of curvature), with the same center as the mirror.

Copending, commonly assigned, U.S. patent application Ser. No. 426,144, filed Dec. 19, 1973, by William R. Harding, now U.S. Pat. No. 3,923,382 provides a partial solution to this problem, by providing a multifaceted mirror for gathering infrared radiation from a plurality of discrete, spaced apart fields of view, and focusing this radiation on a single sensing element. The multifaceted mirror of application Ser. No. 426,144 has a concave surface, this concave surface comprising a plurality of radiation gathering surface portions. Each of the radiation gathering surface portions of the mirror of application Ser. No. 426,144 is itself concave, has a focal length equal to that of the focal length of the other concave radiation gathering surface portions, and is placed in such a configuration that all of the concave surface portions have a common focal point. The shapes of the concave radiation gathering surface portions of the mirror of application Ser. No. 426,144 are preferably spherical polygons (such as hexagons), contiguously arranged so that their focal points are all at the sensing element of the radiation detector. This arrangement is known as "on axis" optics, since the point to which radiation is directed by the individual radiation gathering surface portions of the multifaceted mirror is located at the focal point of each radiation gathering surface portion, i.e., on the axis of each individual facet. The radiation detecting element thus casts a shadow in the center of the field of view emanating from each individual radiation gathering surface portion of the multifaceted mirror.

While the configuration contemplated by application Ser. No. 426,144 is advantageous and in many cases represents a highly desirable mirror facet configuration for the intended use of the radiation detector, it has been found that by making certain modifications in the mirror facet configuration, an improved multifaceted mirror structure for some applications can be produced.

It is, therefore, an object of the present invention to provide an improvement upon the preferably polyhexagonal multifaceted mirror structure of copending application Ser. No. 426,144, to obtain a more efficient use of the available area of the multifaceted mirror.

SUMMARY OF THE INVENTION

According to the present invention, there is provided a multifaceted mirror for gathering infrared radiation from a plurality of discrete, spaced apart fields of view, and reflecting the radiation to an infrared radiation sensing element, the mirror comprising a plurality of concave radiation gathering surface portions, wherein the improvement comprises each concave surface portion being oriented to gather and reflect infrared radiation from a predetermined field of view.

BRIEF DESCRIPTION OF THE DRAWINGS

FIGS. 5, 7, 9, 11, 13 and 15 show radial sectional views of six outer facets having the shape of annular sectors.

FIGS. 6, 8, 10, 12, 14 and 16 show tangential views of these six outer facets.

FIGS. 17–24 are side views of individual inner facets, having the shape of a quadrant; FIGS. 17–24 being arranged in pairs to show mutually perpendicular side views of four such quadrants.

DETAILED DESCRIPTION

The multifaceted mirror of the present invention is chiefly characterized in that each concave surface portion (i.e., each concave portion of the surface) is oriented to gather and reflect infrared radiation from a predetermined field of view, rather than using a configuration which is geometrically symmetrical in many directions, such as contemplated by copending application Ser. No. 426,144. Using a geometrically symmetrical configuration for the various facets of the mirror has the advantage of ease of construction, and also produces a configuration of fields of view which is useful in many infrared intrusion detectors. In accordance with the present invention, however, the directions of orientation of the surface portions of the various facets of the multifaceted mirror are such that each concave surface portion is oriented to gather and reflect infrared radiation from the predetermined field of view. This will usually necessitate the focal points of the various facets being in different locations, mutually spaced apart and distant from the intended location of the infrared radiation sensing element, owing to the different orientations of the surface portions of the various facets. It has been found, however, that it is not necessary for the infrared radiation gathered and reflected by the facets to be reflected to the focal point of the surface portion of each facet. On the contrary, advantages can be obtained by the use of "off axis" optics, wherein the predetermined field of view and the direction to which the gathered infrared radiation is reflected, i.e., the infrared radiation sensing element, are not on the axis of the surface portion of the individual facet.

It is preferred that the concave surface portions of the multifaceted mirror be oriented such that the plurality of predetermined fields of view from which infrared radiation is to be gathered includes a matrix of regularly spaced target locations from which radiation can be transmitted to the plurality of concave radiation gathering and reflecting surface portions, each field of view including a target location. Such an arrangement is illustrated in FIGS. 1 and 2.

Figure 1:
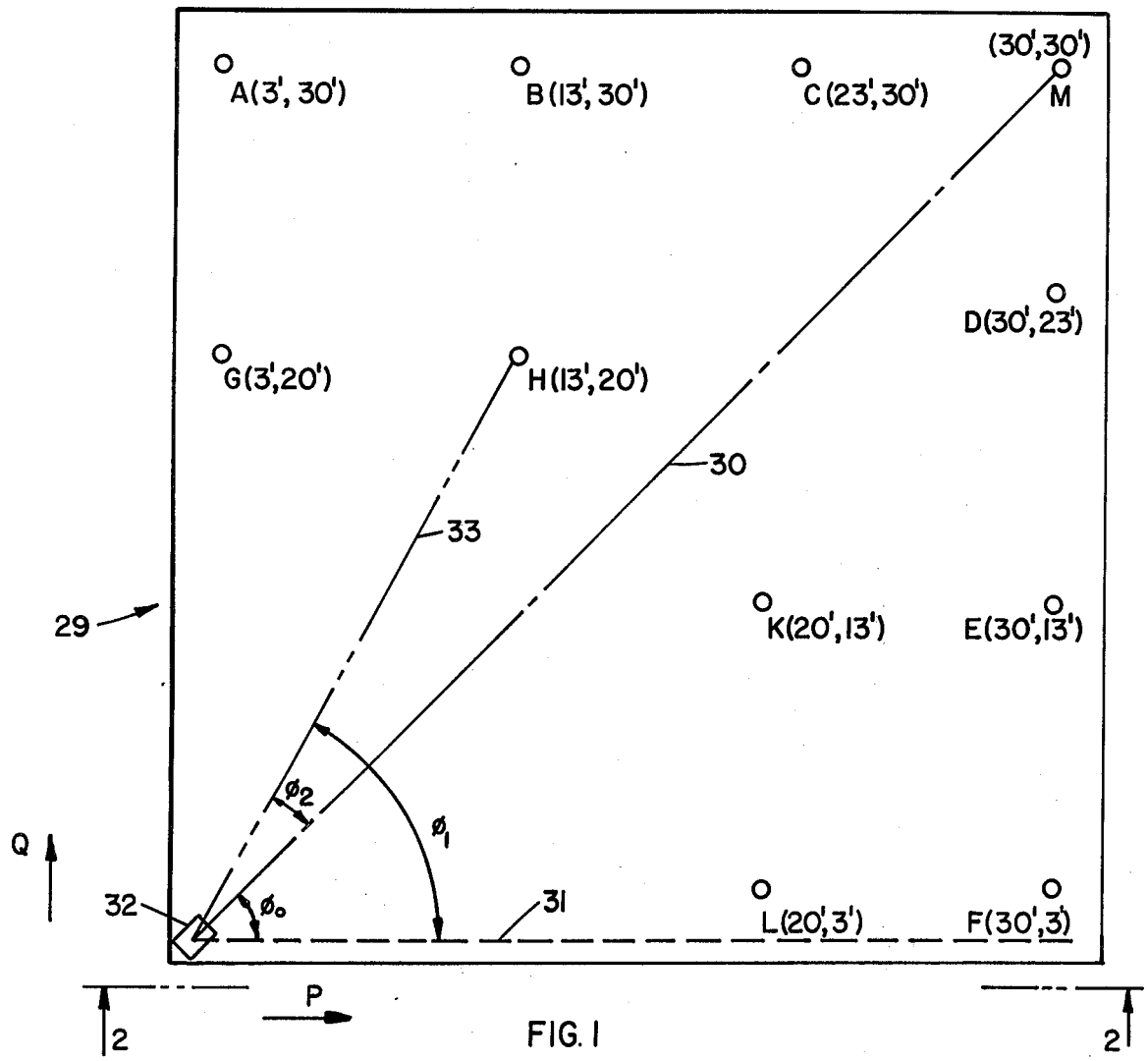
FIG. 1 illustrates a plan view of a room which is desired to be protected by an infrared radiation detector which incorporates the multifaceted mirror of the present invention.
Figure 2:
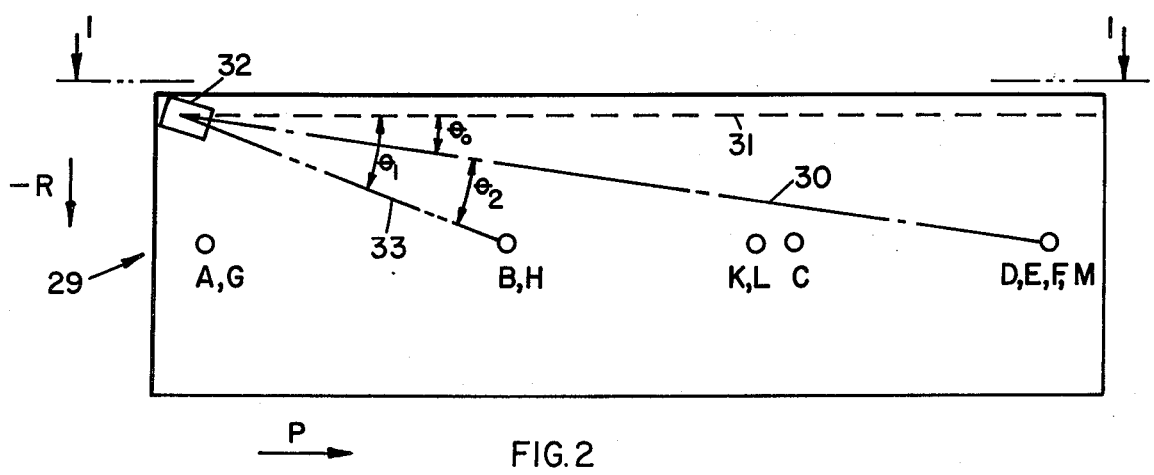
FIG. 2 is a side view of the room of FIG. 1, taken along line 2—2 of FIG. 1, FIG. 1 being taken along line 1—1 of FIG. 2.

Referring now to the drawings, FIGS. 1 and 2 illustrate a room 29 which is desired to be protected by an infrared radiation detector which produces an alarm upon the detection of an intruding human. For purposes of design, the hypothetical room illustrated in FIGS. 1 and 2 has dimensions of in excess of 30 feet wide, in excess of 30 feet deep, and about 10 feet in height. The mirror developed to include a matrix of regularly spaced target locations in such a room will be operative for rooms both larger and smaller than this, however, since the field of view of each concave surface portions of the multifaceted mirror will detect an intruder passing through any portion of the field of view, not just the target location.

The room of FIGS. 1 and 2 includes a matrix of 10 regularly spaced target locations from which radiation can be transmitted. These are identified by the letters A, B, C, D, E, F, G, H, K, and L. The horizontal coordinates (generically identified as P and Q for each location) of each of these 10 locations, in feet, are indicated in FIG. 1, following the letter designation. Also illustrated in FIGS. 1 and 2 is a target location M which lies on the axis 30 of the entire multifaceted mirror. Target location M is used only for reference purposes. Each of the target locations is 4.5 feet below the ceiling, or about 5½ feet from the floor of a 10-foot room. This is indicated mathematically as R = −4.5, R being the vertical coordinate. Thus, each of the 11 target locations (the 10 target locations from which radiation can be transmitted to the plurality of concave radiation gathering and reflecting portions, and the 11 target location on the axis 30 of the multifaceted mirror), has a set of 3 location coordinate numbers. For example, the target location H is located at P = 13 feet, Q = 20 feet, R = −4.5 feet, P, Q, and R being mutually perpendicular coordinate axes of room 29. More specifically, P is the horizontal component, in a direction parallel to a target location reference line 31, of the distance between a target location such as H and the multifaceted mirror, located within detector housing 32. Q is the horizontal component, in a direction perpendicular to target location reference line 31, of the distance between the target location such as H and the multifaceted mirror. R is the vertical component of the distance between the target location such as H and the multifaceted mirror. The line between the target location and the multifaceted mirror is the unreflected line of sight 33, which passes through (i) the intended target location such as H from which infrared radiation can be transmitted to the concave surface portion, and (ii) a reference point near the center of the concave surface portion of the multifaceted mirror.

The angular relationships between axis 30 of the multifaceted mirror, target location reference line 31, and unreflected line of sight 33 are also illustrated in FIGS. 1 and 2. $\phi_0$ and $\theta_0$ are the rotational and elevational components, respectively, of the angle between target location reference line 31 and axis 30. As used herein, "rotational" indicates an amount of rotation about a vertical axis, and "elevational" about a horizontal axis. $\phi_1$ and $\theta_1$ are the rotational and elevational components, respectively, of the angle between target location reference line 31 and unreflected line of sight 33. In terms of coordinates P, Q, and R, $$\tan(\phi_1) = Q/P, \text{ and}$$

$$\tan(\theta_1) = \frac{R}{(P^2 + Q^2)^{1/2}}$$

$\phi_2$ and $\theta_2$ are the rotational and elevational components, respectively, of the angle between unreflected line of sight 33 and axis 30. In other words, $\phi_2 = \phi_1 - \phi_0$, and $\theta_2 = \theta_1 - \theta_0$.

In FIGS. 1 and 2, the sign convention is that angles of rotation counterclockwise in each case are positive. Thus, looking along axis 30 of FIG. 1, angles $\phi_2$ to the left (for target locations A, B, C, G, and H) are positive and angles $\phi_2$ to the right (for target locations D, E, F, K, and L) are negative, relative to axis 30. Angles $\phi_0$ and $\phi_1$ are always positive relative to the target location reference line 31. Likewise, elevations are positive if looking upwards from the point of origin; 0 if looking horizontal from the point of origin; and negative is looking downward from the point of origin. Thus, in FIG. 2, angles $\theta_0$ and $\theta_1$ are negative relative to target location reference line 31, and angles $\theta_2$ are negative relative to axis 30 for all 10 target locations A, B, C, D, E, F, G, H, K, and L. This is so even though D, E, and F coincide with M in FIG. 2, due to the skew orientation of axis 30 in FIG. 2.

Figure 3:
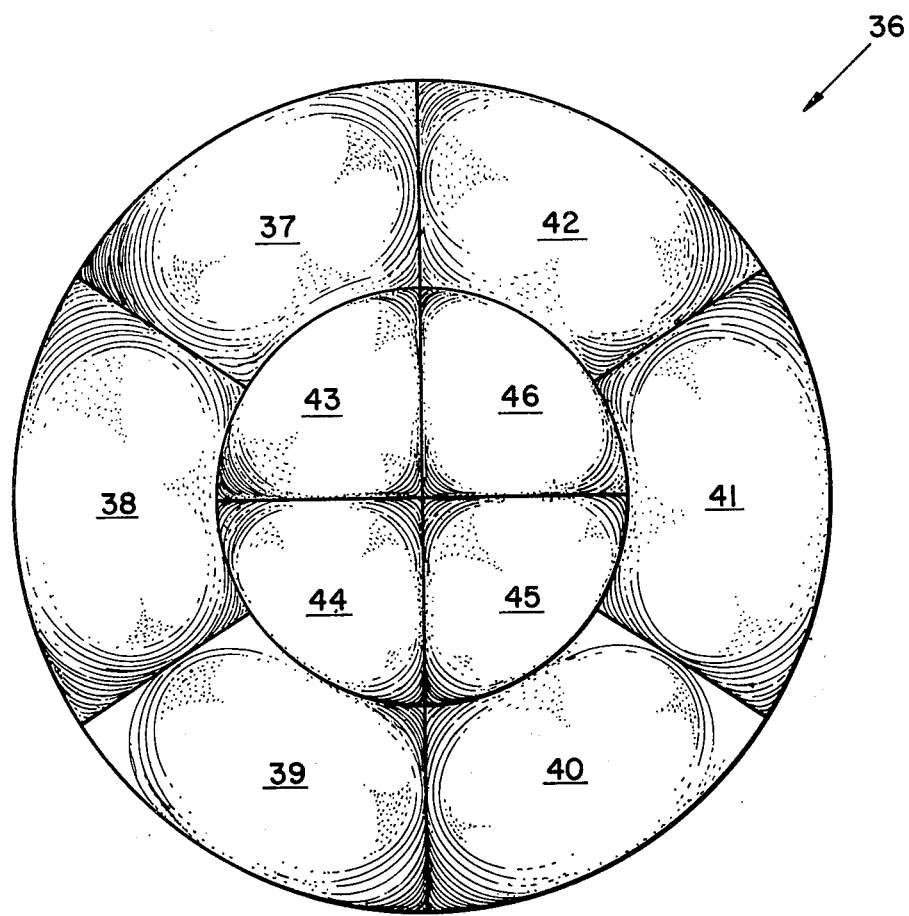
FIG. 3 is a plan view of one embodiment of a multifaceted mirror according to the present invention, viewed in a direction along the axis of the multifaceted mirror, facing the reflective surfaces of the multifaceted mirror.
Figure 4:
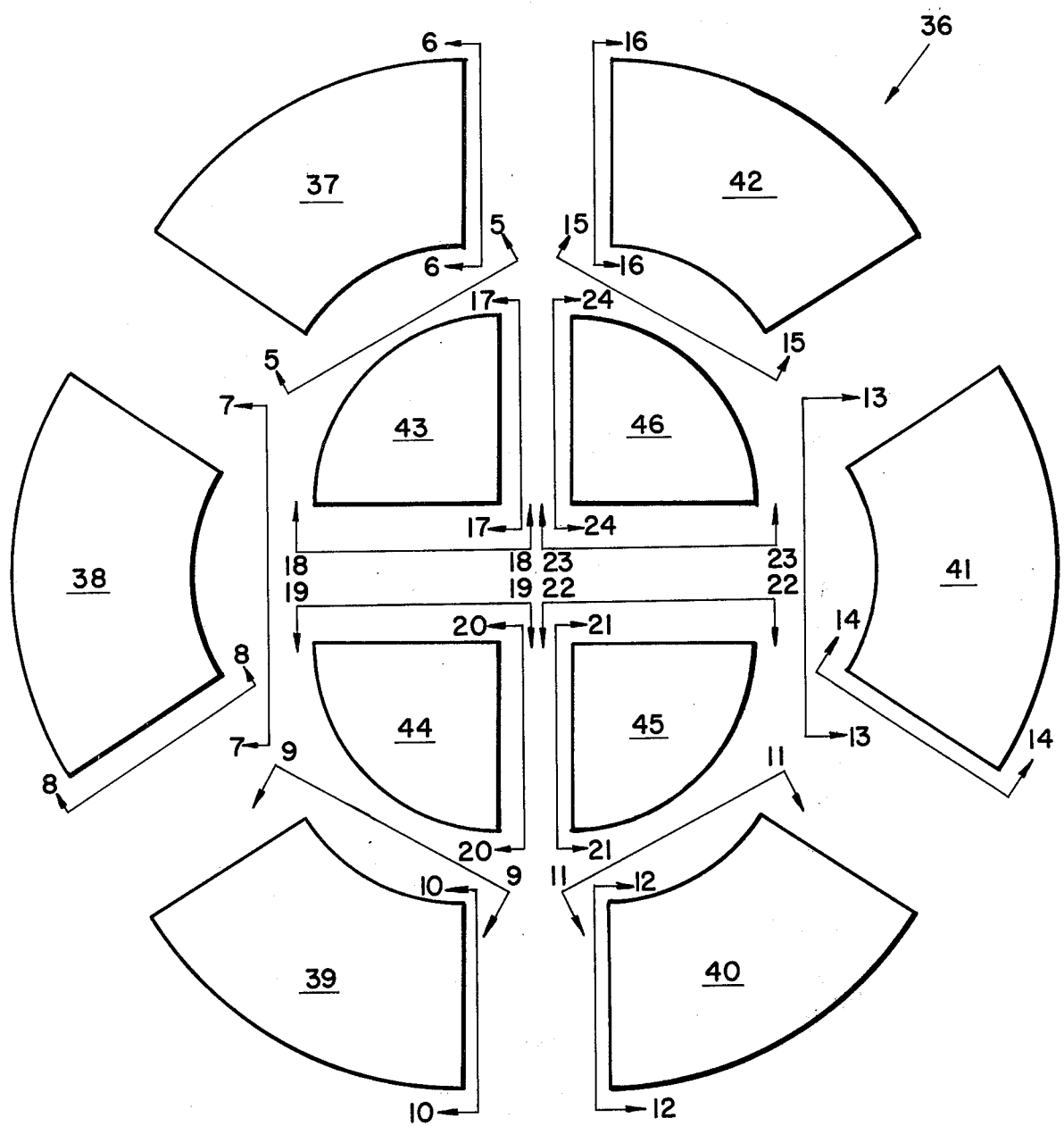
FIG. 4 is an exploded plan view of the multifaceted mirror illustrated in FIG. 3, showing the orientation of partial sectional views 5–24.
Figure 5:
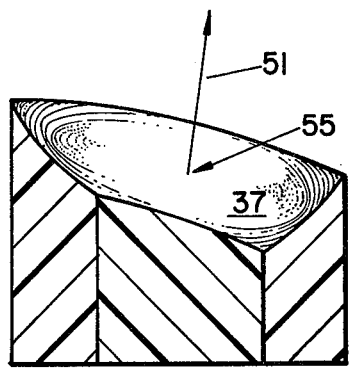
FIGS. 5–24 are partial sectional views of the multifaceted mirror illustrated in FIG. 3, showing the orientation of the reflective concave surface portions of the individual facets.
Figure 6:
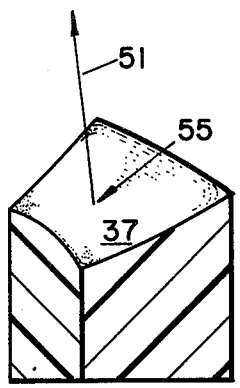
Figure 7:
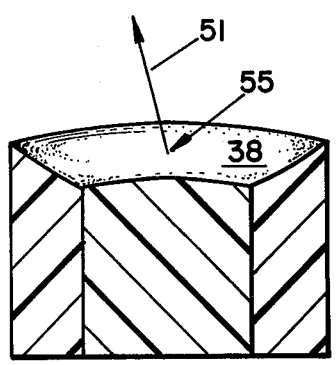
Figure 8:
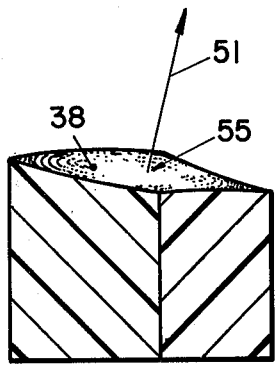
Figure 9:
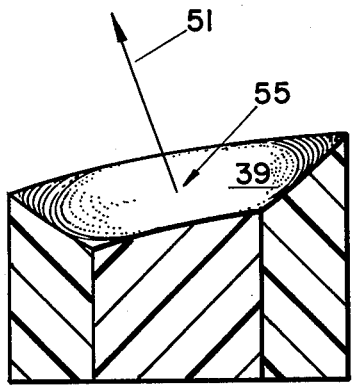
Figure 10:
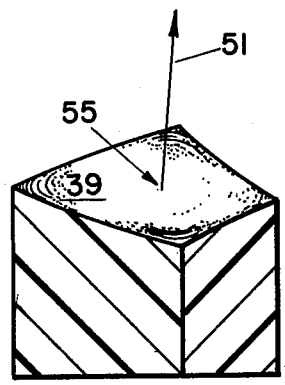
Figure 14:
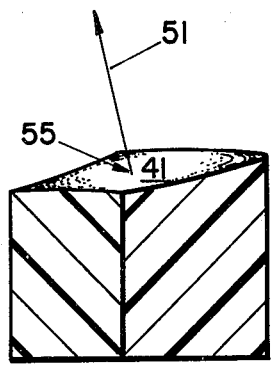
Figure 11:
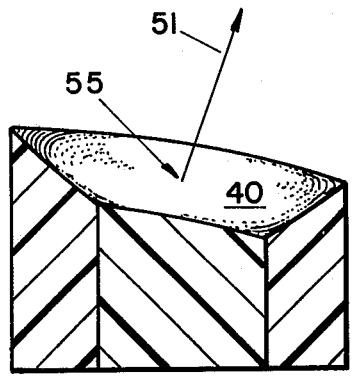
Figure 12:
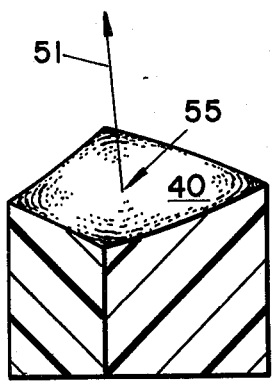
Figure 15:
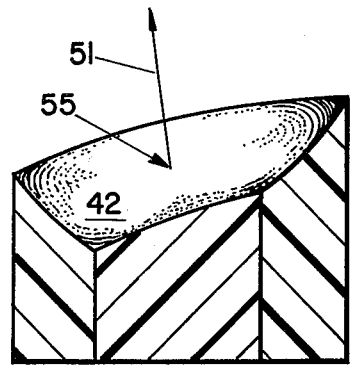
Figure 16:
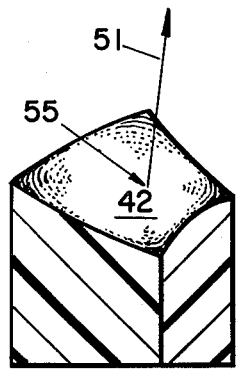
Figure 13:
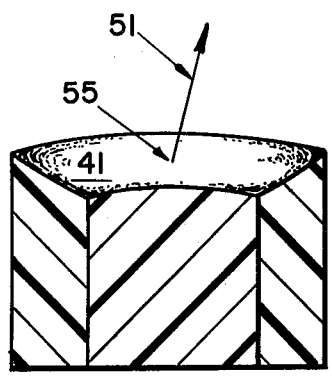
Figure 17:
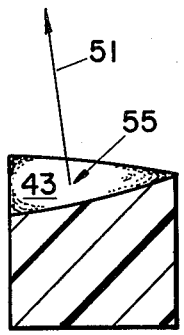
Figure 18:
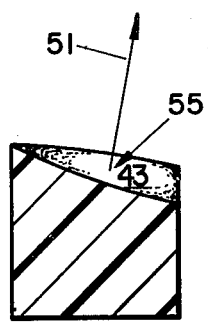
Figure 19:
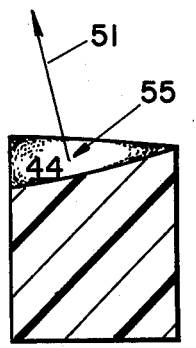
Figure 20:
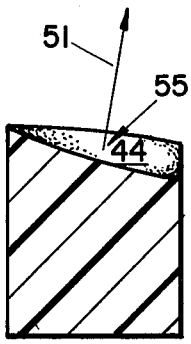
Figure 21:
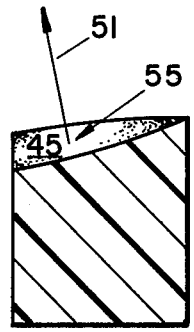
Figure 22:
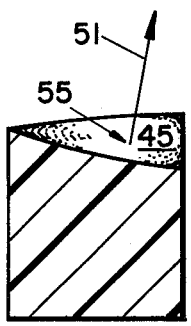
Figure 23:
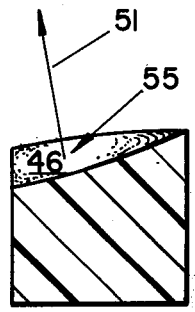
Figure 24:
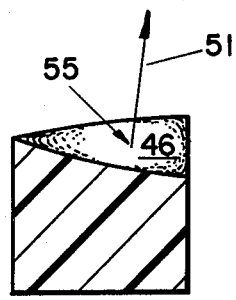

Referring now to FIGS. 3–24, there is illustrated a preferred embodiment of a multifaceted mirror according to the present invention. FIG. 3 is a plan view of this embodiment, viewed in a direction along the axis of the multifaceted mirror, facing the reflected surfaces of the multifaceted mirror 36. FIG. 4 is an exploded plan view of the multifaceted mirror 36 illustrated in FIG. 3, showing the orientation of partial sectional views 5–24. FIGS. 5–24 are partial sectional views of multifaceted mirror 36, each of FIGS. 5–24 being a section of one facet, and showing the orientation of the reflective surface portions of the individual facets. FIGS. 5, 6, 7, ..., 24 are taken along lines 5—5, 6—6, 7—7, ..., 24—24 of FIG. 4. It should be noted that while the 10 facets are illustrated separately in FIGS. 4–24, in actuality the multifaceted mirror is preferably a one-piece object such as a single piece of plastic which is provided with a reflective coating such as flashed silver. For ease of illustration, however, the mirror is broken into its individual facets in FIGS. 4–24. In each of FIGS. 5–24, there is illustrated the perpendicular line 51, perpendicular to a plane tangent to the concave surface portion 37–46 at a point 55 near the center of the concave surface portion 37–46.

It is preferred, but not essential, even though the concave surface portions 37–46 have focal points which are mutually spaced apart and distant from the intended location of the infrared radiation sensing element, that each of the concave radiation gathering surface portions 37–46 should have an equal focal length, and be situated a distance from the intended location of the infrared radiation sensing element distance equal to the common focal length of the concave surface portions 37–46. If for any reason it is desired that the concave surface portions 37–46 have different focal lengths each of the individual concave surface portions 37–46 should preferably be situated at a distance from the intended location of the infrared radiation sensing element equal to the focal length of the concave surface portion concerned.

It will be noted that the plan view of the multifaceted mirror 36, FIG. 3, indicates the projection, in a plane perpendicular to the axis of the multifaceted mirror, of the areas of the various individual surface portions. It is preferred that this plurality of surface portions comprise subgroups of surface portions, the projections, in a plane perpendicular to the axis of the multifaceted mirror, of the areas of the surface portions of each subgroup being approximately equal; and the projection, in a plane perpendicular to the axis of the multifaceted mirror, of the area of an individual surface portion of one subgroup, being larger than the projection, in a plane perpendicular to the axis of the multifaceted mirror, of the area of an individual surface portion of another subgroup.

In the multifaceted mirror illustrated in FIG. 3, surface portions 37–42 constitute one subgroup of surface portions, the projections of areas, in a plane perpendicular to the axis of the multifaceted mirror, of which are approximately equal. Surface portions 43–46 constitute a second subgroup of surface portions, the projections of areas, in a plane perpendicular to the axis of the multifaceted mirror, of which are approximately equal. The individual surface portions 37–42, which have larger projections of area, in a plane perpendicular to the axis of the multifaceted mirror, are oriented to gather infrared radiation from predetermined fields of view including target locations more distant from the multifaceted mirror than the target locations of the fields of view of the surface portions 43–46, which have smaller projections of area, in a plane perpendicular to the axis of the multifaceted mirror. This is so that the near and far target zones will be seen by the multifaceted mirror with approximately equal sensitivity.

While equalizing sensitivity is a preferred characteristic of the multifaceted mirror structure, other factors such as construction of the multifaceted mirror structure with convenience and efficiency should also be taken into account. For example, it is more convenient for the individual surface portions of one subgroup to have a projection of area, in a plane perpendicular to the axis of the multifaceted mirror, which is approximately equal. In particular, it is convenient and therefore preferred that one subgroup of surface portions be an inner section of circular sectors, such as quadrants 43–46 in FIG. 3, and another subgroup of surface portions be an outer section of annular sectors such as annular sectors 37–42 in FIG. 3.

By "circular sectors" and "annular sectors", as these terms are used herein, it is meant that the projected area, in a plane perpendicular to the axis of the multifaceted mirror, is either a sector of a circle of a sector of an annulus, as the case may be. In actuality, the surface portion is concave, preferably a portion of a spherical surface. The configuration illustrated in FIG. 3, wherein one subgroup of surface portions is an outer section of six annular sectors and another subgroup is an inner section of four quadrants, and wherein the projection, in a plane perpendicular to the axis of the multifaceted mirror, of the area of each annular sector is approximately twice the projection, in a plane perpendicular to the axis of the multifaceted mirror, of the area of each quadrant, is particularly preferred.

Figure 25:
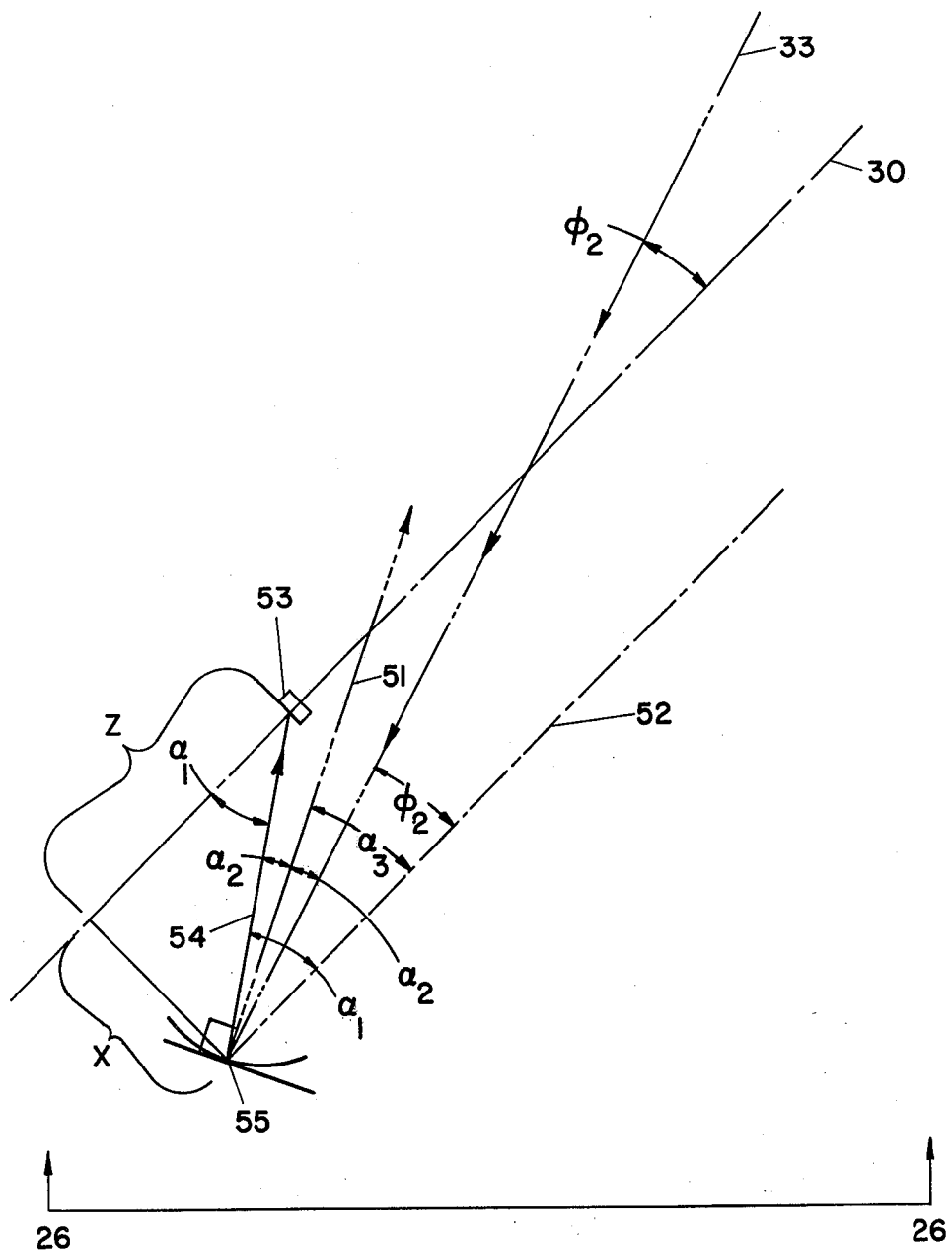
FIGS. 25 and 26 show the rotational and elevational components, respectively, of angles relevant to the orientation of the surface portions of the multifaceted mirror, FIGS. 25 and 26 being viewed along lines 25—25 and 26—26 of FIGS. 26 and 25, respectively.
Figure 26:
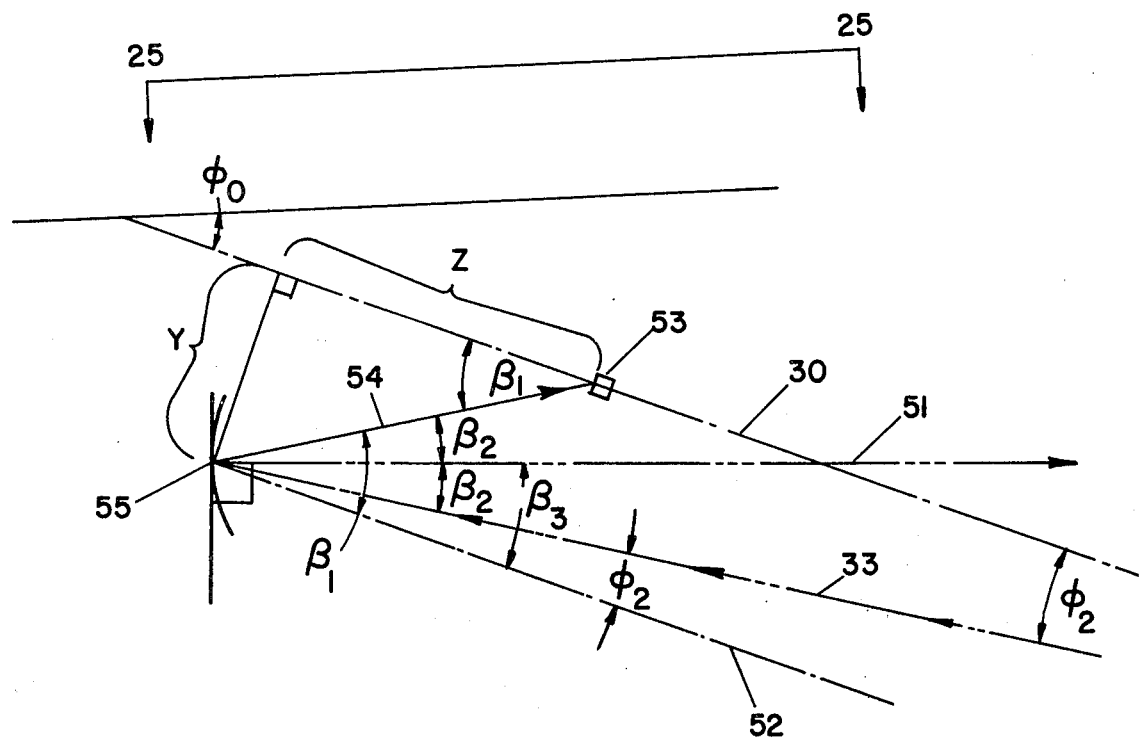

Each of FIGS. 5–24 is a partial sectional view of the multifaceted mirror 36, illustrating the orientation of the concave surface portion of the individual facets of the multifaceted mirror. The angles at which the surfaces are inclined illustrated by arrows in each of FIGS. 5–24, are chosen such that the plurality of predetermined fields of view from which infrared radiation is to be gathered, including a matrix of regularly spaced target locations (A, B, C, D, E, F, G, H, K, and L, see FIGS. 1 and 2), from which radiation is to be transmitted to the plurality of concave radiation gathering reflecting surface portions 37–46, will each reflect light from the field of view including the target locations to a common point which is the intended location of the infrared radiation sensing element. These angles are determined according to the formulas $$\alpha_3 = \tfrac{1}{2}(\alpha_1 + \phi_2), \text{ and}$$

$$\beta_3 = \tfrac{1}{2}(\beta_1 + \theta_2),$$

wherein $\alpha_3$ and $\beta_3$ are the rotational and elevational components, respectively, of the angle between (a) a perpendicular line 51 (see FIGS. 25 and 26), perpendicular to a plane tangent to the concave surface portion at a point near the center of the concave surface portion, and (b) a parallel line 52, parallel to the axis of the multifaceted mirror, passing through the point at which the perpendicular line passes through the concave surface portion. $\alpha_1$ and $\beta_1$ are the rotational and elevational components, respectively, of the angle between (a) the axis 30 of the multifaceted mirror, this axis passing through the intended location of the infrared radiation sensing element 53 toward which radiation is to be reflected, and (b) the reflected line of sight 54, passing through (i) a point on the axis 30 of the multifaceted mirror toward which infrared radiation is to be reflected at at which the infrared radiation sensing element 53 is to be located, and (ii) the point 55 on the concave surface portion through which perpendicular line 51 and parallel line 52 pass. Since axis 30 and parallel line 52 are parallel to each other, $\alpha_1$ and $\beta_1$ are also the rotational and elevational components, respectively, of the angle between parallel line 52 and reflected line of sight 54. Perpendicular line 51 is the bisector of the angle between unreflected line of sight 33 and reflected line of sight 54, so $\alpha_2$ and $\beta_2$ are the rotational and elevational components, respectively, of each of the angles (1) between unreflected line of sight 33 and perpendicular line 51; and (2) between perpendicular line 51 and reflected line of sight 54. Also, $\phi_2$ and $\theta_2$, in addition being components of the angle between line of sight 33 and axis 30, are the rotational and elevational components, respectively, between parallel line 52 and unreflected line of sight 33. These angular relationships are illustrated in FIGS. 25 and 26.

The reflected line of sight 54 is further defined by the formulas $$\sin(\alpha_1) = \frac{x}{(x^2 + y^2 + z^2)^{1/2}}, \text{ and}$$

$$\sin(\beta_1) = \frac{y}{(x^2 + y^2 + z^2)^{1/2}}.$$

Figure 27:
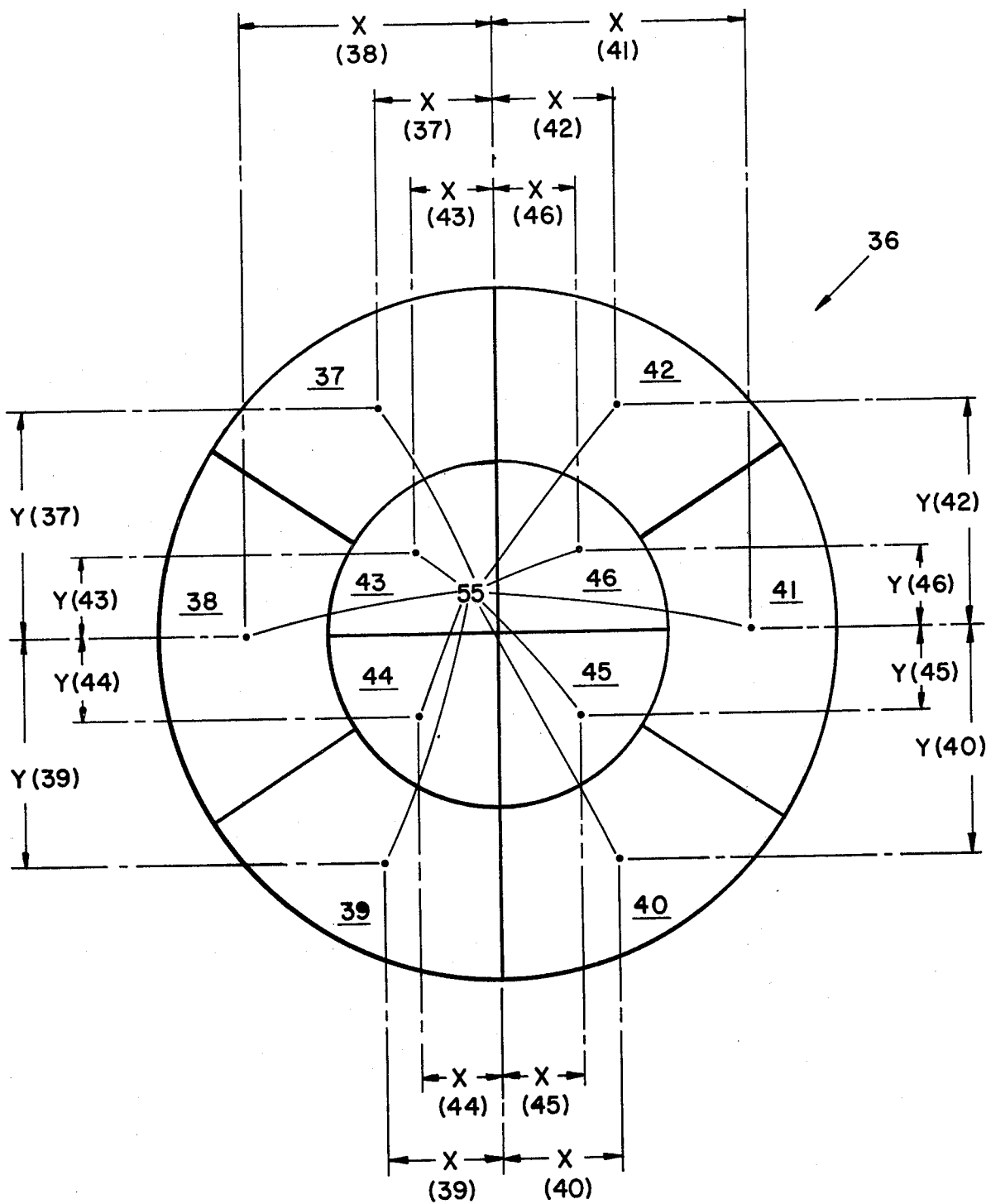
FIG. 27 shows the relationship of coordinates of individual surface portions to the multifaceted mirror.

In these formulas, $x$ is the horizontal component of the distance between the point 55 on the concave surface portion through which perpendicular line 51 and parallel line 52 pass, and (b) the axis 30 of the multifaceted mirror; $y$ is the vertical component of the distance between (a) point 55 on the concave surface portion through which perpendicular line 51 and parallel line 52 pass, and (b) the axis 30 of the multifaceted mirror; and $z$ is the component in the direction of the axis 30 of the multifaceted mirror, between the point 55 on the concave portion through which perpendicular line 51 and parallel line 52 pass, and the point on the axis of the multifaceted mirror toward which infrared radiation is to be reflected and at which an infrared radiation sensing element 53 is to be located. In this context, the references, "vertical" and "horizontal" are taken with respect to the axis 30 of the multifaceted mirror, assuming the axis of the multifaceted mirror to be horizontal. The coordinate directions, $x$, $y$ and $z$ are therefore mutually perpendicular. FIG. 27 illustrates the multifaceted mirror in the same manner as FIG. 3, i.e., in plan view, viewed in a direction along the axis of the multifaceted mirror, facing the reflective surfaces of the multifaceted mirror. Each of the 10 reflective surfaces 37–46 has a value for $x$ and a value for $y$, as shown in FIG. 27.

As indicated above, it is preferred that each of the concave radiation gathering surface portions 37–46 should have an equal focal length, and be situated a distance from the intended location of the infrared radiation sensing element a distance equal to the common focal length of the concave surface portions 37–46. In terms of coordinates $x$, $y$, and $z$, it is preferred that the coordinate $z$ be selected such that point 55 on the concave surface portion near the center of the concave surface portion and through which perpendicular line 51 and parallel line 52 pass, is located a distance $f$ from infrared radiation sensing element 53 (see FIGS. 25 and 26). In mathematical terms, it is preferred that $z = (f^2 - x^2 - y^2)^{1/2}$, $f$ being the common focal length of the concave surface portions 37–46; or in the event that it is desired to have the concave surface portions 37–46 have different focal lengths, the focal length for the surface portion concerned.

The invention will now be illustrated with a specific example, which describes the preferred method of producing a multifaceted mirror according to the present invention.

EXAMPLE

The multifaceted mirror according to this example comprises ten concave surface portions, each of which is oriented to gather and reflect infrared radiation form a predetermined field of view, each field of view including one of a matrix of regularly spaced target locations from which radiation can be transmitted to the plurality of concave radiation gathering and reflecting surface portions. The matrix of regularly spaced target locations of this example have coordinates along mutually perpendicular coordinate axis P, Q and R as set forth in Table 1.

Table 1

| Target Location | P | Q | R |
| --- | --- | --- | --- |
| A | 3' | 30' | −4.5' |
| B | 13' | 30' | −4.5' |
| C | 23' | 30' | −4.5' |
| D | 30' | 23' | −4.5' |
| E | 30' | 13' | −4.5' |
| F | 30' | 3' | −4.5' |
| G | 3' | 20' | −4.5' |
| H | 13' | 20' | −4.5' |
| K | 20' | 13' | −4.5' |
| L | 20' | 3' | −4.5' |

The multifaceted mirror is developed having 10 facets, each facet having a concave surface portion which is oriented to gather and reflect infrared radiation from a predetermined field of view which includes one of the above target locations; each of the concave surface portions having a focal point which is mutually spaced apart and distant from the intended location of the infrared radiation sensing element. The 10 surface portions of the multifaceted mirror of this example comprise two subgroups of surface portions, the projections, in a plane perpendicular to the axis of the multifaceted mirror, of the areas of these surface portions in each subgroup being approximately equal. One subgroup of surface portions is an inner section of four circular sectors, or quadrants, and another subgroup of surface portions is an outer section of six annular sectors, each circular sector and annular sector being a portion of a spherical surface. The projection, in a plane perpendicular to the axis of the multifaceted mirror, of the area of the individual surface portions of the annular sectors is approximately twice the projection, in a plane perpendicular to the axis of the multifaceted mirror, of the area of one of the quadrants of the inner section. The surface portions of the six facets which are annular sectors, i.e., the larger surface portions, are oriented to gather infrared radiation from predetermined fields of view which include target locations A, B, C, D, E, and F. The four quadrants are oriented to gather infrared radiation from predetermined fields of view which include target locations G, H, K, and L. A configuration of surface portions as illustrated in FIG. 3, is selected, having an overall diameter of about 2.25 inches. The correlation between the surface portions, the target locations which they are selected to view, and the values of the $x$ and $y$ coordinates for the multifaceted mirror of this example are set forth in Table 2.

Table 2

| Surface Portion | Target Location | x | y |
| --- | --- | --- | --- |
| 37 | A | −0.422" | +0.731 |
| 38 | C | −0.844" | 0 |

Table 2-continued

| Surface Portion | Target Location | x | y |
|---|---|---|---|
| 39 | B | −0.422" | −0.731 |
| 40 | E | +0.422" | −0.731 |
| 41 | D | +0.844" | 0 |
| 42 | F | +0.422" | +0.731 |
| 43 | G | −0.281" | +0.731 |
| 44 | H | −0.281" | −0.731 |
| 45 | K | +0.281" | −0.731 |
| 46 | L | +0.281" | +0.731 |

For the multifaceted mirror of this example, the concave surface portions are to be portions of a spherical surface having a focal length of 1.3637 inches (i.e., having a radius of 2.7274 inches). Each surface portion is to be oriented such that the point 55 near the center of the concave surface portion is approximately one focal length from the point on the axis of the multifaceted mirror toward which the infrared radiation is to be reflected and at which an infrared radiation sensing element is to be located. The value of $f$ is therefore substituted in the formulas for determining $\alpha_1$ and $\beta_1$, so that these angles are defined by the formulas $$\sin(\alpha_1) = x/f, \text{ and}$$

$$\sin(\beta_1) = y/f.$$

The value of $z$ for each concave surface portion is then later adjusted so that point 55 of each mirror is one focal length from the point on the axis of the multifaceted mirror towards which infrared radiation is to be reflected and at which an infrared sensing element is to be located. The values of $\alpha_1$ and $\beta_1$ for each surface portion, as thus defined, are set forth in Table 3.

Table 3

| Surface Portion | $\alpha_1$ | $\beta_1$ |
|---|---|---|
| 37 | −18° 4' | +32° 30' |
| 38 | −38° 21' | 0° |
| 39 | −18° 4' | −32° 30' |
| 40 | +18° 4' | −32° 30' |
| 41 | +38° 21' | 0° |
| 42 | +18° 4' | +32° 30' |
| 43 | −11° 54' | +11° 54' |
| 44 | −11° 54' | −11° 54' |
| 45 | +11° 54' | −11° 54' |
| 46 | +11° 54' | +11° 54' |

The values for $\phi_0$ and $\theta_0$ for axis 30, passing through point M as illustrated in FIGS. 1 and 2, are calculated by trigonometry as $\phi_0 = +45°$, $\theta_0 = −6° 3'$. These values are constant for all target locations. $\phi_1$, $\theta_1$, $\phi_2$, and $\theta_2$ are then calculated according to the formulas $$\tan(\phi_1) = Q/P;$$

$$\tan(\theta_1) = \frac{R}{(P^2 + Q^2)^{1/2}};$$

$$\phi_2 = \phi_1 - \phi_0; \text{ and}$$

$$\theta_2 = \theta_1 - \theta_0.$$

The values of $\phi_1$, $\theta_1$, $\phi_2$ and $\theta_2$ are set forth in Table 4, for the multifaceted mirror of this example.

Table 4

| Target Location | $\phi_1$ | $\theta_1$ | $\phi_2$ | $\theta_2$ |
|---|---|---|---|---|
| A | +84° 17' | − 8° 27' | +39° 17' | −2° 24' |
| B | +66° 34' | − 7° 51' | +21° 34' | −1° 48' |
| C | +52° 31' | − 6° 47' | + 7° 31' | − 44' |
| D | +37° 29' | − 6° 47' | − 7° 31' | − 44' |
| E | +23° 26' | − 7° 51' | −21° 34' | −1° 48' |
| F | + 5° 43' | − 8° 27' | −39° 17' | −2° 24' |
| G | +81° 28' | −12° 31' | +36° 28' | −6° 28' |
| H | +56° 59' | −10° 40' | +11° 59' | −4° 37' |
| K | +33° 1' | −10° 40' | −11° 59' | −4° 37' |
| L | + 8° 32' | −12° 31' | −36° 28' | −6° 28' |

The values of $\alpha_3$ and $\beta_3$ are then calculated according to the formulas $$\alpha_3 = \tfrac{1}{2}(\alpha_1 + \phi_2), \text{ and}$$

$$\beta_3 = \tfrac{1}{2}(\beta_1 + \phi_2),$$

using the pairing of surface portions and target locations set forth in Table 2. The result is a multifaceted mirror wherein the approximate orientation of the first annular sector of the outer section of the multifaceted mirror (corresponding to surface portion 37 in FIG. 3 and oriented to gather and reflect infrared radiation from a predetermined field of view including target location A in FIGS. 1 and 2), is defined by $\alpha_3 = +28°$ 40', $\beta_3 = −17° 29'$.

The approximate orientation of the second annular sector, lefthandedly circumferentially adjacent the first annular sector (corresponding to surface portion 38 in FIG. 3 and oriented to gather and reflect infrared radiation from a predetermined field of view including target location C in FIGS. 1 and 2) is defined by $\alpha_3 = +22°$ 56', $\beta_3 = −22'$. By "lefthandedly circumferentially adjacent" is meant adjacent in a counterclockwise direction, when the multifaceted mirror is viewed along its axis, in a direction facing the reflective surface portions.

The approximate orientation of the third annular sector, lefthandedly circumferentially adjacent the second annular sector (corresponding to surface portion 39 in FIG. 3 and oriented to gather and reflect infrared radiation from a predetermined field of view including target location B in FIGS. 1 and 2), is defined by $\alpha_3 = +19° 49'$, $\beta_3 = +15° 30'$.

The approximate orientation of the fourth annular sector, lefthandedly circumferentially adjacent the third annular sector (corresponding to surface portion 40 in FIG. 3, and oriented to gather and reflect infrared radiation from a predetermined field of view including target location E in FIGS. 1 and 2), is defined by $\alpha_3 = −19° 49'$, $\beta_3 = +15° 30'$.

The approximate orientation of the fifth annular sector, lefthandedly circumferentially adjacent the fourth annular sector (corresponding to surface portion 41 in FIG. 3 and oriented to gather and reflect infrared radiation from a predetermined field of view including target location D in FIGS. 1 and 2), is defined by $\alpha_3 = −22° 56'$, $\beta_3 = −22'$.

The approximate orientation of the sixth annular sector, lefthandedly circumferentially adjacent the fifth annular sector, and righthandedly circumferentially adjacent the first annular sector (corresponding to surface portion 42 in FIG. 3 and oriented to gather and reflect infrared radiation from a predetermined field of view including target location F in FIGS. 1 and 2), is defined by $\alpha_3 = −28° 40'$, $\beta_3 = −17° 29'$. By "righthandedly circumferentially adjacent" is meant adjacent in a clockwise direction, when the multifaceted mirror is viewed along its axis, in a direction facing the reflective surface portions.

The approximate orientation of the first quadrant of the inner section of the multifaceted mirror, the first quadrant being inwardly radially adjacent the first annular sector and inwardly radially adjacent a portion of the second annular sector (corresponding to surface portion 43 in FIG. 3 and oriented to gather and reflect infrared radiation from a predetermined field of view including target location G in FIGS. 1 and 2), is defined by $\alpha_3 = +24° 11'$, $\beta_3 = -9° 11'$.

The approximate orientation of the second quadrant of the inner section of the multifaceted mirror, the second quadrant being lefthandedly circumferentially adjacent the first quadrant, inwardly radially adjacent a portion of the second annular sector, and inwardly radially adjacent the third annular sector (corresponding to surface portion 44 in FIG. 3 and oriented to gather and reflect infrared radiation from a predetermined field of view including target location H in FIGS. 1 and 2), is defined by $\alpha_3 = +11° 56'$, $\beta_3 = +3° 8'$.

The approximate orientation of the third quadrant of the inner section of the multifaceted mirror, the third quadrant being lefthandedly circumferentially adjacent the second quadrant, inwardly radially adjacent the fourth annular sector, and inwardly radially adjacent a portion of the fifth annular sector (corresponding to surface portion 45 in FIG. 3 and oriented to gather and reflect infrared radiation from a predetermined field of view including target location K in FIGS. 1 and 2), is defined by $\alpha_3 = -11° 56'$, $\beta_3 = +3° 8'$.

The approximate orientation of the fourth quadrant of the inner section of the multifaceted mirror, the fourth quadrant being inwardly radially adjacent a portion of the fifth annular sector, inwardly radially adjacent the sixth annular sector, lefthandedly circumferentially adjacent the third quadrant and righthandedly circumferentially adjacent the first quadrant (corresponding to surface portion 46 in FIG. 3 and oriented to gather and reflect infrared radiation from a predetermined field of view including target location L in FIGS. 1 and 2), is defined by $\alpha_3 = -24° 11'$, $\beta_3 = -9° 11'$.

As indicated above, the orientations of the four quadrants and six annular sectors are approximate. This is for two reasons. First, the precise orientation of the surface portions is not as critical as might be supposed from the angles given above. In fact, a small degree of irregularity in the orientations of the surface portions can be tolerated, so long as the predetermined fields of view of the concave surface portions include reasonably spaced apart zones through which an intruder cannot pass without setting off the alarm. If, however, the fields of view are adjacent, it might be possible for an intruder to enter one field of view, and transfer to another field of view without causing a change in signal seen by the infrared radiation detecting element. Secondly, it is preferred to orient the final location of the concave surface portions empirically, for example by placing a light source at the intended location of the infrared radiation detecting element, relative to a prototype of the multifaceted mirror, and adjusting each facet surface portion to an orientation such that the image of the light source is viewed at each of the ten target locations. This is done, for example, by preparing a podium upon which each concave surface portion can sit. Four of the podiums will have a quadrant cross section, and six of the podiums will have annular segment cross sections. Each podium is provided with an upper plane surface, the approximate orientation of which is defined by the angles $\alpha_3$ and $\beta_3$ for the particular facet concerned. A portion of a concave spherical mirror is then cemented to the top of the podium, adjustment in the precise orientation of the concave spherical mirror portion being made empirically in order to assure that the light source located at the intended location of the infrared radiation sensing element is seen at the target location for the particular concave surface portion of the multifaceted mirror. When the spherical mirror portion is oriented in the proper location, the cement is allowed to set up, thus fixing the location of the mirror segment. The process is repeated for each podium until all 10 facets are properly oriented. The prototype model is then used to produce additional copies of the prototype, cast in one piece of plastic.

According to one method, a molding negative is molded from the mounted spherical mirror segments, on their podiums, so that the molding negative has a shape complementary to that of the mounted spherical mirror segments. A positive image is then molded from the molding negative, such that the positive image has a shape essentially identical to that of the prototype of mounted spherical mirror segments, but is instead a single piece of molded plastic. This molded positive image is then coated with a metallic radiation reflective coating to form a multifaceted mirror.

The multifaceted mirror is then connected to a conventional circuitry such as described for example, in U.S. Pat. No. 3,604,933, or U.S. Pat. No. 3,703,718. The device when so constructed is found to be a sensitive infrared radiation intrusion detector, which can be mounted in a corner of a room to cover 10 separate zones, one for each of the radiation gathering surface portions, and thereby provide protection against intruders entering into widely separated portions of the room. Furthermore, it is found that the 10 separate zones or fields of view include a matrix of regularly spaced target locations from which radiation can be transmitted to the plurality of concave radiation gathering and reflective surface portions, each field of view including a target location.

Other methods of producing multifaceted mirrors in accordance with the present invention can be adapted from the methods described in copending, commonly assigned, U.S. patent application Ser. No. 426,144, filed Dec. 19, 1973, by William R. Harding, the disclosure of which is incorporated by reference.

I claim:

1. A multifaceted mirror for gathering infrared radiation from a plurality of discrete, spaced-apart fields of view, and reflecting the radiation to an infrared radiation sensing element, the mirror comprising a plurality of concave radiation gathering surface portions, wherein the improvement comprises each concave surface portion being oriented to gather and reflect infrared radiation from a predetermined field of view nonparallel to the axis of said concave surface and wherein the concave surface portions have focal points which are mutually spaced-apart and distant from the intended location of the infrared radiation sensing element whereby masking of the concave radiation gathering surfaces by the detector is avoided.

2. A multifaceted mirror according to claim 1, wherein the concave surface portions are oriented such that the plurality of predetermined fields of view from which infrared radiation is to be gathered includes a matrix of regularly spaced target locations from which radiation can be transmitted to the plurality of concave radiation gathering and reflecting surface portions, each field of view including a target location.

3. A multifaceted mirror according to claim 2, wherein each of the concave radiation gathering surface portions has an equal focal length.

4. A multifaceted mirror according to claim 2, wherein each concave surface portion of the multifaceted mirror is oriented to gather infrared radiation from a predetermined field of view according to the formulas 1. $\alpha_3 = \frac{1}{2}(\alpha_1 + \phi_2)$ and
2. $\beta_3 = \frac{1}{2}(\beta_1 + \beta_2)$, wherein
3. $\alpha_3 =$ the rotational component of the angle between
   a. a perpendicular line, perpendicular to a plane tangent to the concave surface portion at a point near the center of the concave surface portion, and
   b. a parallel line, parallel to the axis of the multifaceted mirror, passing through the point at which the perpendicular line passes through the concave surface portion;
4. $\beta_3 =$ the elevational component of the angle between
   a. the perpendicular line, and
   b. the parallel line;
5. $\alpha_2 =$ the rotational component of the angle between
   a. the axis of the multifaceted mirror, the axis passing through the intended location of an infrared radiation sensing element toward which radiation is to be reflected, and
   b. a reflected line of sight, passing through
      i. a point on the axis of the multifaceted mirror toward which infrared radiation is to be reflected and at which an infrared radiation sensing element is to be located, and
      ii. the point on the concave surface portion through which the perpendicular and parallel lines pass;
6. $\beta_1 =$ the elevational component of the angle between
   a. the axis of the multifaceted mirror, and
   b. the reflected line of sight; the reflected line of sight being further defined by the formulas $$\sin(\alpha_1) = \frac{x}{(x^2 + y^2 + z^2)^{1/2}}, \text{ and} \quad (7)$$

$$\sin(\beta_1) = \frac{y}{(x^2 + y^2 + z^2)^{1/2}}, \text{ wherein} \quad (8)$$

9. $x =$ the horizontal component of the distance between
   a. the point on the concave surface portion through which the perpendicular and parallel lines pass, and
   b. the axis of the multifaceted mirror;
10. $y =$ the vertical component of the distance between
    a. the point on the concave surface portion through which the perpendicular and parallel lines pass, and
    b. the axis of the multifaceted mirror; and
11. $z =$ the component in the direction of the axis of the multifaceted mirror, between
    a. the point on the concave surface portion through which the perpendicular and parallel lines pass, and
    b. the point on the axis of the multifaceted mirror toward which infrared radiation is to be reflected and at which an infrared radiation sensing element is to be located;
12. $\phi_2 =$ the rotational component of the angle between
    a. the unreflected line of sight passing through
       i. the intended target location from which infrared radiation can be transmitted to the concave surface portion, and
       ii. the point on the concave surface portion through which the perpendicular and parallel lines pass; and
    b. the parallel line; and
13. $\theta_2 =$ the elevational component of the angle between
    a. the unreflected line of sight; and
    b. the parallel line; the unreflected line of sight being further defined by the formulas
14. $\phi_2 = \phi_1 - \phi_0$, and
15. $\theta_2 = \theta_1 - \theta_0$, wherein
16. $\phi_0 =$ the rotational component of the angle between
    a. a target location reference line from which distances to the target locations are measured, and
    b. the axis of the multifaceted mirror;
17. $\theta_0 =$ the elevational component of the angle between
    a. the target location reference line; and
    b. the axis of the multifaceted mirror;
18. $\phi_1 =$ the rotational component of the angle between
    a. the target location reference line, and
    b. the unreflected line of sight;
19. $\theta_1 =$ the elevational component of the angle between
    a. the target location reference line, and
    b. the unreflected line of sight; angles $\phi_1$ and $\theta_1$ being further defined by the formulas
20. $\tan(\phi_1) = Q/P$, and $$\tan(\theta_1) = \frac{R}{(P^2 + Q^2)^{1/2}}, \quad (21)$$

22. $P =$ the horizontal component, in a direction parallel to the target location reference line, of the distance between
    a. the target location, and
    b. the multifaceted mirror;
23. $Q =$ the horizontal component, in a direction perpendicular to the target location reference line, of the distance between
    a. the target location, and
    b. the multifaceted mirror; and
24. $R =$ the vertical component, of the distance between
    a. the target location, and
    b. the multifaceted mirror.

5. A multifaceted mirror according to claim 2, wherein the plurality of surface portions comprises subgroups of surface portions, the projections, in a plane perpendicular to the axis of the multifaceted mirror, of the areas of the surface portions of each subgroup being approximately equal; and the projection, in a plane perpendicular to the axis of the multifaceted mirror, of the area of an individual surface portion of one subgroup being larger than the projection, in a plane perpendicular to the axis of the multifaceted mirror, of the area of an individual surface portion of another subgroup; the individual surface portions having a larger projection of area, in a plane perpendicular to the axis of the multifaceted mirror, being oriented to gather infrared radiation from predetermined fields of view including target locations more distant from the multifaceted mirror than the target locations of the fields of view of the surface portions having a smaller projections of area in a plane perpendicular to the axis of the multifaceted mirror.

6. A multifaceted mirror according to claim 5, wherein one subgroup of surface portions is an inner section of circular sectors, and another subgroup of surface portions is an outer section of annular sectors, each circular sector and each annular sector being a portion of a spherical surface.

7. A multifaceted mirror according to claim 6, wherein the sectors of the inner section are four quadrants.

8. The multifaceted mirror according to claim 7, wherein one subgroup of surface portions is an outer section of at least six annular sectors.

9. A multifaceted mirror according to claim 8, wherein the projection, in a plane perpendicular to the axis of the multifaceted mirror, of the area of each annular sector is approximately twice the projection, in a plane perpendicular to the axis of the multifaceted mirror, of the area of each quadrant.

10. A multifaceted mirror according to claim 6, wherein
   1. the approximate orientation of a first annular sector of the outer section of the multifaceted mirror is defined by $\alpha_3 = +28° 40'$, $\beta_3 = -17° 20'$;
   2. the approximate orientation of a second annular sector, lefthandedly circumferentially adjacent said first annular sector, is defined by $\alpha_3 = +22° 56'$, $\beta_3 = -22'$;
   3. the approximate orientation of a third annular sector, lefthandedly circumferentially adjacent said second annular sector, is defined by $\alpha_3 = +19° 49'$, $\beta_3 = +15° 30'$;
   4. the approximate orientation of a fourth annular sector, lefthandedly circumferentially adjacent said third annular sector, is defined by $\alpha_3 = -19° 49'$, $\beta_3 = +15° 30'$;
   5. the approximate orientation of a fifth annular sector, lefthandedly circumferentially adjacent said fourth annular sector, is defined by $\alpha_3 = -22° 56'$, $\beta_3 = -22'$;
   6. the approximate orientation of a sixth annular sector, lefthandedly circumferentially adjacent said fifth annular sector, and righthandedly circumferentially adjacent said first annular sector, is defined by $\alpha_3 = -28° 40'$, $\beta_3 = -17° 29'$;
   7. the approximate orientation of a first quadrant of the inner section of the multifaceted mirror, said first quadrant being inwardly radially adjacent said first annular sector and inwardly radially adjacent a portion of said second annular sector, is defined by $\alpha_3 = +24° 11'$, $\beta_3 = -9° 11'$;
   8. the approximate orientation of a second quadrant of the inner section of the multifaceted mirror, said second quadrant being lefthandedly circumferentially adjacent said first quadrant, inwardly radially adjacent a portion of said second annular sector, and inwardly radially adjacent said third annular sector, is defined by $\alpha_3 = +11° 56'$, $\beta_3 = +3° 8'$;
   9. the approximate orientation of a third quadrant of the inner section of the multifaceted mirror, said third quadrant being lefthandedly circumferentially adjacent said second quadrant, inwardly radially adjacent said fourth annular sector, and inwardly radially adjacent a portion of said fifth annular sector, is defined by $\alpha_3 = -11° 56'$, $\beta_3 = +3° 8'$; and
   10. the approximate orientation of a fourth quadrant of the inner section of the multifaceted mirror, said fourth quadrant being inwardly radially adjacent a portion of said fifth annular sector, inwardly radially adjacent said sixth annular sector, lefthandedly circumferentially adjacent said third quadrant and righthandedly circumferentially adjacent said first quadrant, is defined by $\alpha_3 = -24° 11'$, and $\beta_3 = -9° 11'$.

* * * * *

UNITED STATES PATENT AND TRADEMARK OFFICE
CERTIFICATE OF CORRECTION

PATENT NO. : 3,972,598
DATED : August 3, 1976
INVENTOR(S) : Raymond J. Kunz

It is certified that error appears in the above-identified patent and that said Letters Patent are hereby corrected as shown below:

Column 13, line 32; Claim 4:

"$\alpha_2$" should be --- $\alpha_1$ ---.

Column 15, line 40; Claim 10:

"20'" should be --- 29' ---.

Signed and Sealed this

Twenty-sixth Day of October 1976

[SEAL]

Attest:

RUTH C. MASON
*Attesting Officer*

C. MARSHALL DANN
*Commissioner of Patents and Trademarks*